(12) United States Patent
Nishibashi et al.

(10) Patent No.: US 10,082,401 B2
(45) Date of Patent: Sep. 25, 2018

(54) MOVEMENT SUPPORT APPARATUS AND MOVEMENT SUPPORT METHOD

(71) Applicant: MITSUBISHI ELECTRIC CORPORATION, Tokyo (JP)

(72) Inventors: Kumi Nishibashi, Tokyo (JP); Takashi Irie, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 29 days.

(21) Appl. No.: 15/027,497

(22) PCT Filed: Oct. 25, 2013

(86) PCT No.: PCT/JP2013/078929
§ 371 (c)(1),
(2) Date: Apr. 6, 2016

(87) PCT Pub. No.: WO2015/059812
PCT Pub. Date: Apr. 30, 2015

(65) Prior Publication Data
US 2016/0231135 A1    Aug. 11, 2016

(51) Int. Cl.
*G01C 21/36* (2006.01)
*G01C 21/20* (2006.01)
*G10L 13/08* (2013.01)

(52) U.S. Cl.
CPC ......... *G01C 21/3629* (2013.01); *G01C 21/20* (2013.01); *G01C 21/3644* (2013.01); *G01C 21/3691* (2013.01); *G10L 13/086* (2013.01)

(58) Field of Classification Search
None
See application file for complete search history.

(56) References Cited

U.S. PATENT DOCUMENTS

| 7,386,437 | B2* | 6/2008 | Brulle-Drews | .... G01C 21/3602 704/270 |
| 2009/0072997 | A1* | 3/2009 | Shrum, Jr. | ............. G08G 1/127 340/905 |
| 2012/0191336 | A1* | 7/2012 | Baudisch | ............... G01C 21/36 701/300 |

(Continued)

FOREIGN PATENT DOCUMENTS

| JP | H09-035186 A | 2/1997 |
| JP | 11-6743 A | 1/1999 |

(Continued)

*Primary Examiner* — Khoi H Tran
*Assistant Examiner* — Kelly D Williams
(74) *Attorney, Agent, or Firm* — Birch, Stewart, Kolasch & Birch, LLP

(57) ABSTRACT

A navigation apparatus includes a route calculation unit, an environment information obtaining unit and a controller. The route calculation unit calculates a route to a destination based on map information, a position of a vehicle and a destination of the vehicle. By the time when the moving body arrives at a guidance given point at which the vocal output is given, the environment information obtaining unit obtains environment information related to an environment of an outside of the moving body. The controller causes an audio output device to selectively vocally output one of a name and a feature of the landmark object based on the environment information at the guidance given point.

11 Claims, 13 Drawing Sheets

(56) References Cited

U.S. PATENT DOCUMENTS

| | | | |
|---|---|---|---|
| 2013/0253834 A1* | 9/2013 | Slusar | G01C 21/3608 701/540 |
| 2013/0261969 A1* | 10/2013 | Nakamura | G01C 21/3602 701/533 |
| 2014/0005935 A1* | 1/2014 | Slusar | G01C 21/20 701/454 |

FOREIGN PATENT DOCUMENTS

| | | |
|---|---|---|
| JP | 2002-116033 A | 4/2002 |
| JP | 2005-249485 A | 9/2005 |
| JP | 2009-025071 A | 2/2009 |
| JP | 2009-186372 A | 8/2009 |
| WO | WO 2012/086054 A1 | 6/2012 |

* cited by examiner

F I G. 1
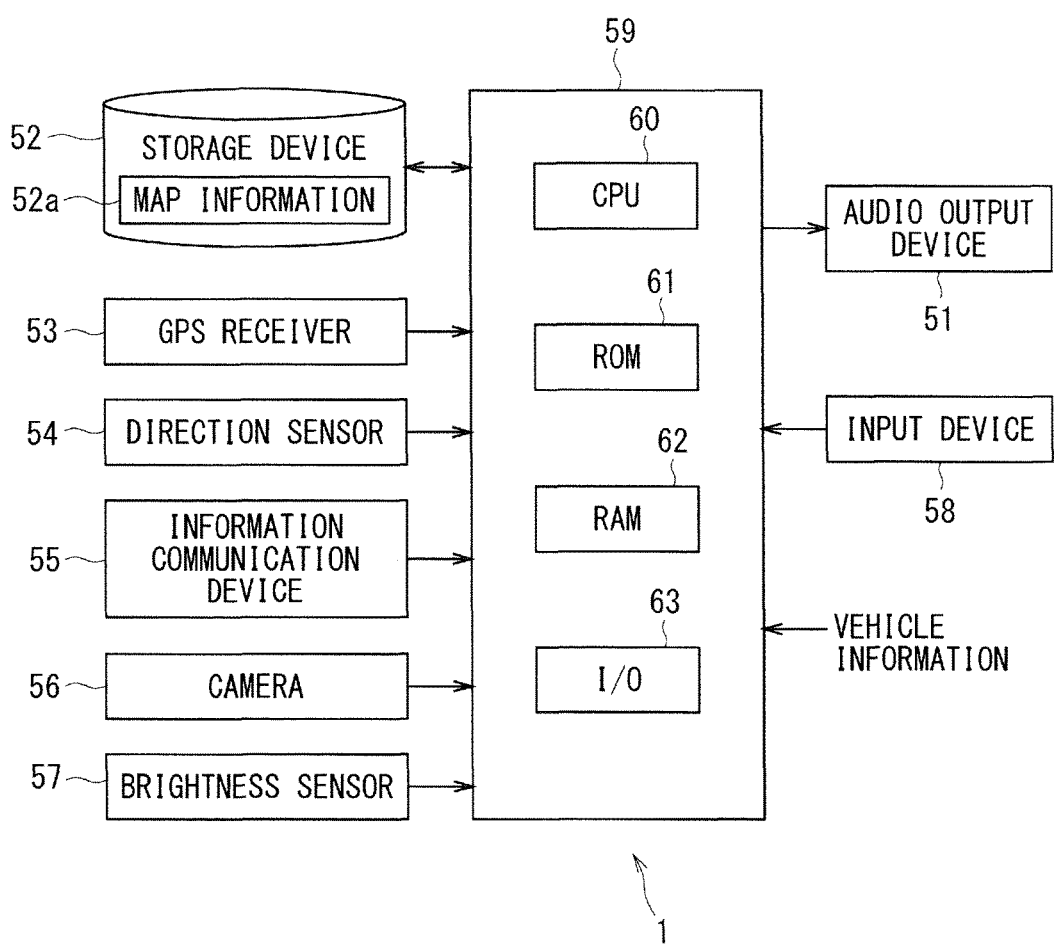

F I G. 3
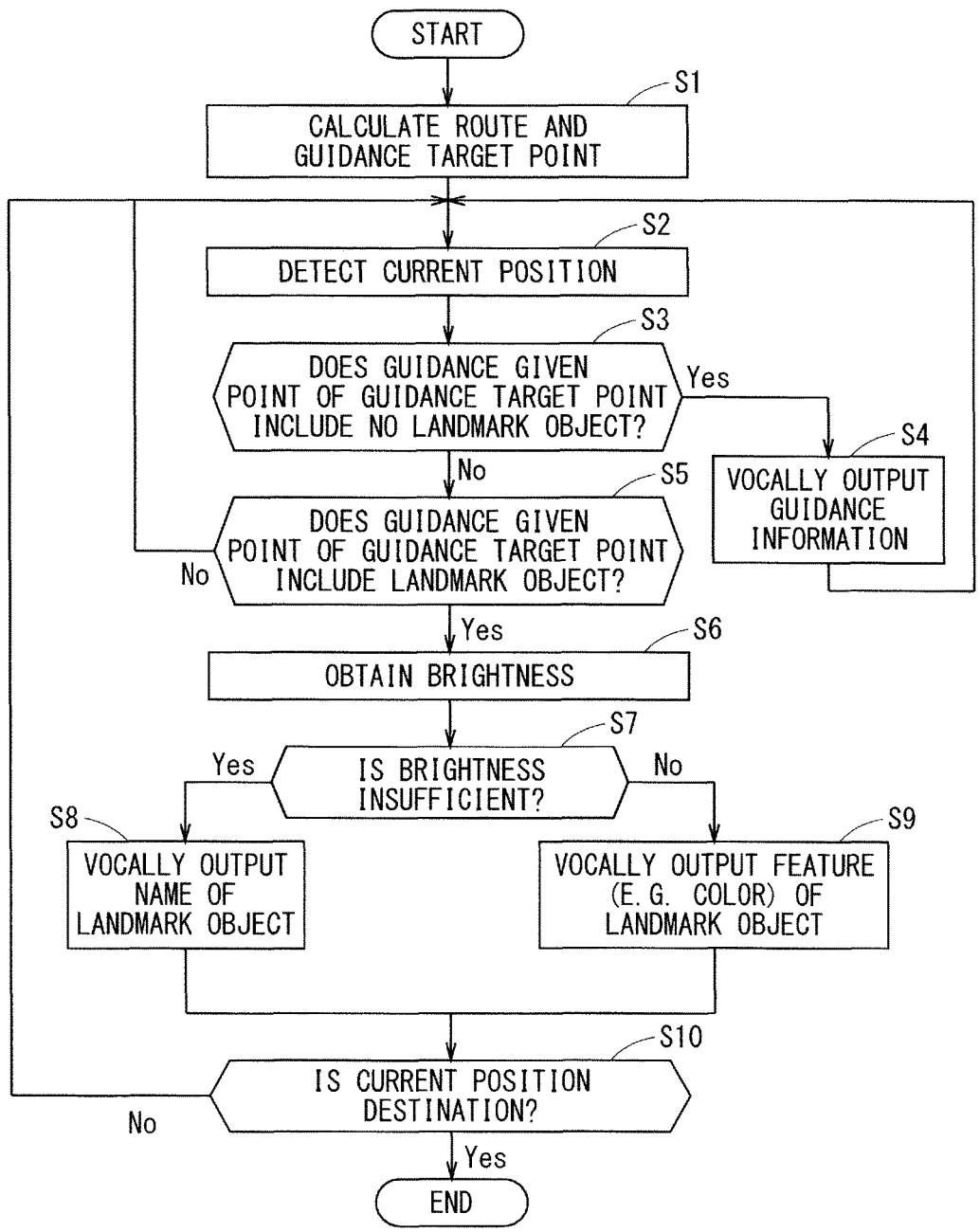

F I G. 9
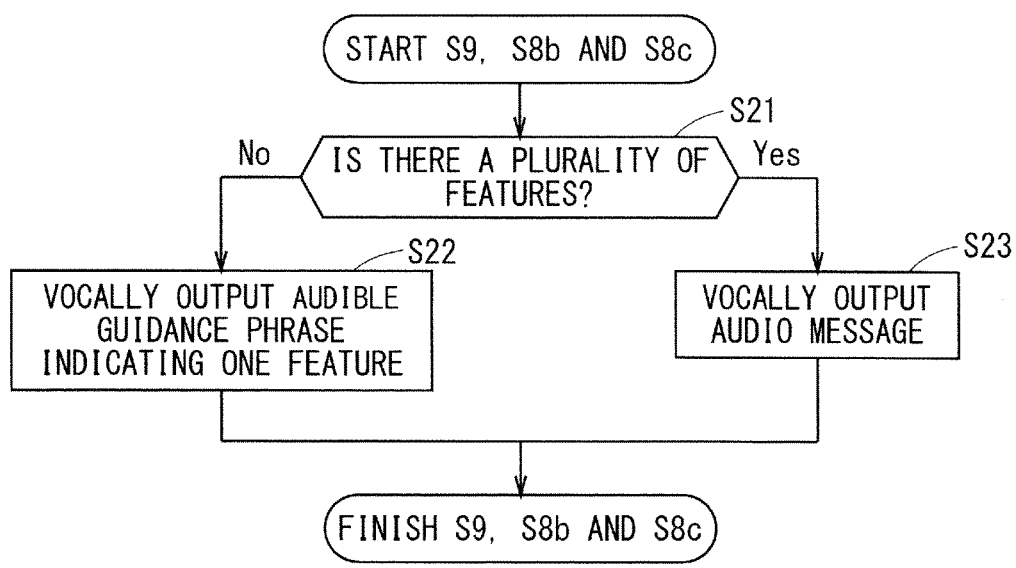

F I G. 13
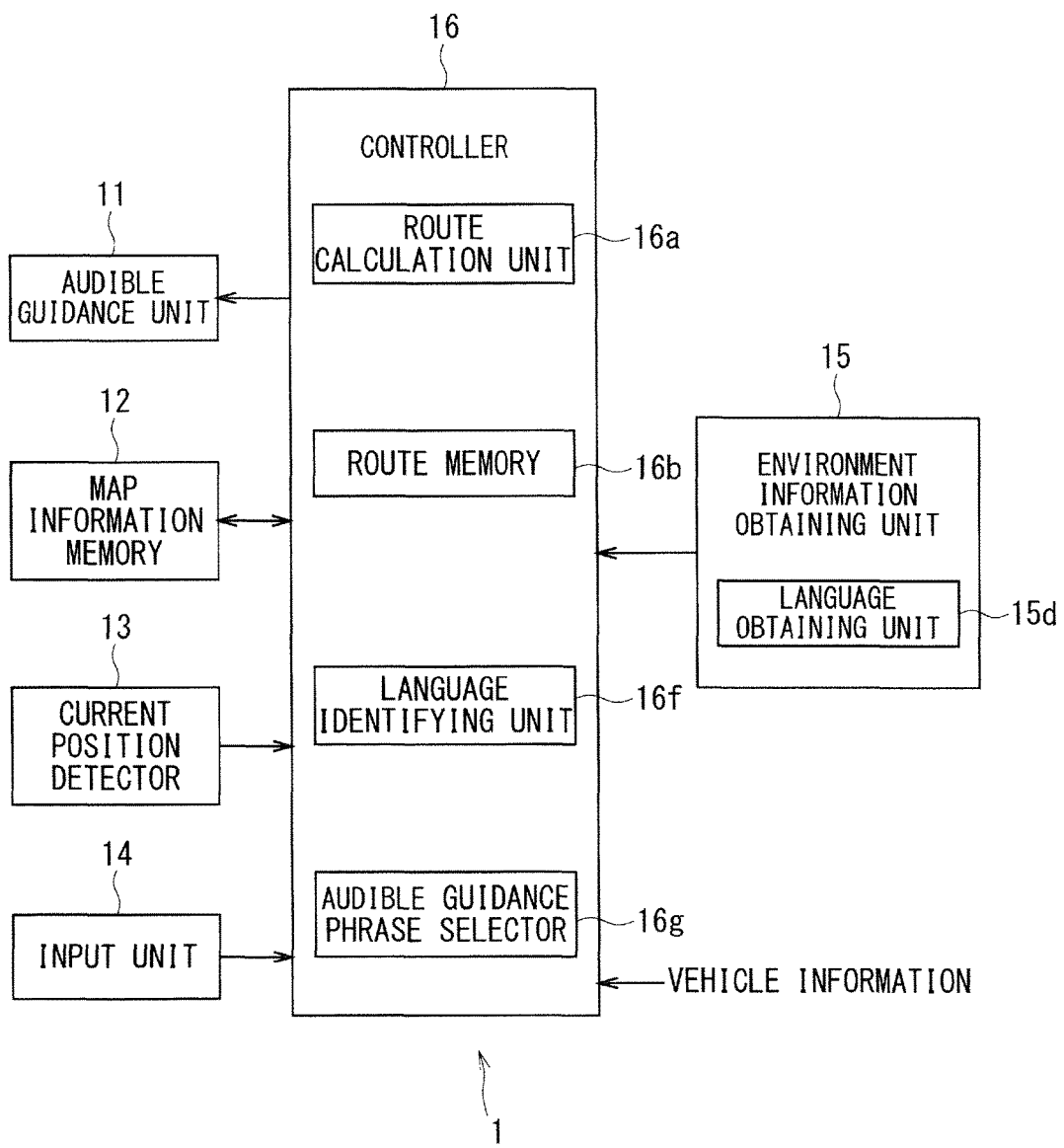

MOVEMENT SUPPORT APPARATUS AND MOVEMENT SUPPORT METHOD

TECHNICAL FIELD

The present invention relates to a movement support apparatus and a movement support method which support movement of a moving body by causing an audio output device which moves with the moving body to vocally output an announcement of a landmark object.

BACKGROUND ART

A movement support apparatus which supports movement of a moving body by vocally outputting an announcement of a landmark object such as a landmark building for a driver is known. For example, Patent Document 1 discloses a navigation apparatus which vocally outputs a color or the like of a facility for the facility (building) which is a landmark of an intersection before this intersection (guidance target point) at which a vehicle needs to turn right or left. This navigation apparatus allows the driver to audibly recognize a facility (landmark object) which is a landmark of a guidance target point before the driver arrives at the guidance target point.

PRIOR ART DOCUMENT

Patent Document

Patent Document 1: Japanese Patent Application Laid-Open No. 11-6743 (1999)

SUMMARY OF INVENTION

Problems to be Solved by the Invention

However, for a landmark object which is a landmark of a guidance target point, a conventional navigation apparatus can only either vocally output its name or vocally output its feature such as a color. Hence, a driver cannot appropriately recognize the vocally announced landmark object in some cases.

Meanwhile, when a navigation apparatus tries to vocally output both of a name and a feature of a landmark object which is a landmark of a guidance target point, the navigation apparatus needs to vocally output the name and the feature of the landmark object quite before the guidance target point. Therefore, rather, a driver has difficulty in recognizing a landmark object.

Therefore, the present invention has been made in light of the above problem, and an object of the present invention is to provide a technique which can adequately vocally output an announcement of a landmark object.

Means for Solving the Problems

A movement support apparatus according to the present invention is a movement support apparatus that supports movement of a moving body by causing an audio output device that moves with the moving body to vocally output an announcement of a landmark object, and includes: a processor to execute a program; and a memory to store the program which, when executed by the processor, results in performance of the following steps. The steps include obtaining map information, obtaining a position of the moving body, obtaining a destination of the moving body, obtaining a route to the destination retrieved based on said map information, the position of the moving body and the destination of the moving body, obtaining environment information related to an environment of an outside of the moving body by the time when the moving body arrives at a guidance given point that corresponds to the route and at which the vocal output is given, and causing the audio output device to selectively vocally output one of a name and a feature of the landmark object based on the environment information at the guidance given point. The environment information includes at least one of a brightness of the outside of the moving body, information indicating a weather of the outside of the moving body, information obtained by a vehicle front image obtaining unit or a radar, for identifying whether or not there is a visual obstacle in front of the moving body, and a language that is a target for which it is determined whether or not the target matches a language set to the movement support apparatus, and that is used in an area corresponding to the position of the moving body.

Effects of the Invention

The present invention causes an audio output device to selectively vocally output one of a name and a feature of a landmark object based on environment information at a guidance given point. Consequently, it is possible to adequately vocally output an announcement of the landmark object.

An object, features, aspects and advantages of the present invention will be more apparent from the following detailed description and accompanying drawings.

BRIEF DESCRIPTION OF DRAWINGS

FIG. 1 is a block diagram showing an example of a hardware configuration of a navigation apparatus according to a first embodiment.

FIG. 3 is a flowchart showing an operation of the navigation apparatus according to the first embodiment.

FIG. 9 is a flowchart showing an operation of the navigation apparatus according to the modified example 2.

FIG. 13 is a block diagram showing an example of a functional configuration of a navigation apparatus according to a modified example 6.

DESCRIPTION OF EMBODIMENT

First Embodiment

Figure 2:
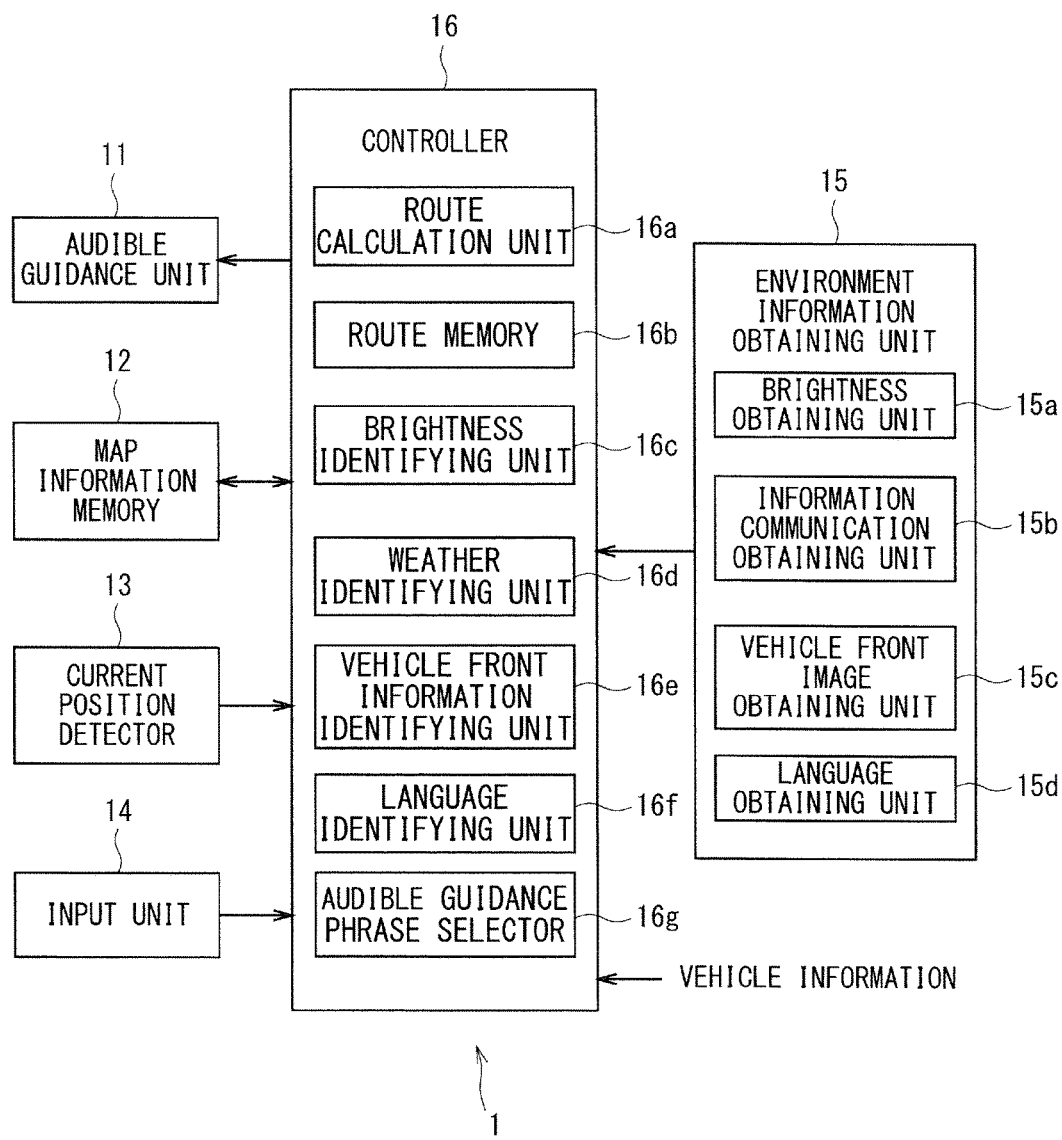
FIG. 2 is a block diagram showing an example of a functional configuration of a navigation apparatus according to the first embodiment.

A first embodiment of the present invention will be described by using as an example a case where a movement support apparatus according to the present invention is applied to a navigation apparatus mounted on a vehicle. FIG. 1 is a block diagram showing an example of a hardware configuration of the navigation apparatus. FIG. 2 is a block diagram showing an example of a functional configuration of the navigation apparatus. A vehicle on which a navigation apparatus 1 shown in FIGS. 1 and 2 is mounted will be referred to as a "vehicle" and described below.

First, a hardware configuration of the navigation apparatus 1 will be described with reference to FIG. 1. The navigation apparatus 1 includes an audio output device 51, a storage device 52, a GPS (Global Positioning System) receiver 53, a direction sensor 54, an information communication device 55, a camera 56, a brightness sensor 57, an input device 58 and a control unit 59 which integrally controls these components.

The audio output device 51 is a device which includes, for example, a speaker and which moves with the vehicle and vocally outputs an announcement of various pieces of information for a driver.

The navigation apparatus 1 according to the first embodiment calculates a guidance target point (e.g. a point at which the vehicle needs to turn left or right, a via location or a destination) on a route from a current position to the destination. Then, the navigation apparatus 1 determines whether or not the guidance target point includes a predetermined landmark object such as a landmark facility (e.g. a building adjacent to an intersection). Further, the navigation apparatus 1 causes the audio output device 51 to vocally output an announcement of the landmark object when the vehicle arrives at a point which is a predetermined distance distant from the guidance target point for which it has been determined that the guidance target point includes the landmark object. Thus, the navigation apparatus 1 can support movement of the vehicle by vocally outputting an announcement of the landmark object.

In addition, a point at which an announcement of a landmark object is vocally output will be referred to as a "guidance given point" below. For example, to the predetermined distance for determining whether or not the vehicle has arrived at the guidance given point, about 500 m is applied when the guidance target point is a local street or about 2 km is applied when the guidance target point is on a highway. Naturally, the distance is not limited to the distances described for example (about 500 m and about 2 km).

The storage device 52 includes, for example, a HDD (Hard Disk Drive), a DVD (Digital Versatile Disc) and a DVD drive device. The storage device 52 obtains digitized map information 52a from an outside of the navigation apparatus 1 in advance, and stores the map information 52a.

In this regard, the map information 52a includes information (e.g. polygon data) for displaying a map, information (e.g. data of a node corresponding to a point on a road or data of a link corresponding to a road partitioned by a node) for calculating a route, and audible guidance phrases including audio data. The navigation apparatus 1 according to the first embodiment causes the audio output device 51 to vocally output an audible guidance phrase related to a landmark object among the audible guidance phrases included in the map information 52a when the vehicle arrives at a guidance given point. Thus, the navigation apparatus 1 can announce the landmark object at the guidance given point.

Further, the storage device 52 not only stores the above-described map information 52a but also stores a region (e.g. country) obtained by partitioning areas on a map and information (referred to as "region/language associated information" below) in which the region and a main language of the region are associated.

The GPS receiver 53 receives a signal from a GPS satellite, and detects a current position of the vehicle (e.g. a coordinate of a latitude and a longitude) based on the signal.

The direction sensor 54 detects an angular velocity of a yaw angle of the vehicle, and detects a traveling direction of the vehicle based on the angular velocity.

The information communication device 55 is, for example, a communication device such as a mobile telephone or a smartphone, or a receiver which receives a signal from a TMC (Traffic Message Channel), a VICS (Vehicle Information and Communication System) (registered trademark) or a DSRC (Dedicate Short Range Communication). The information communication device 55 which is such a receiver can receive various pieces of information from a communication network including a website by way of wireless communication with an external communication device.

The camera 56 captures an image of a situation in front of the vehicle and generates the image showing the situation.

The brightness sensor 57 is a sensor which detects a brightness (lightness) of an outside of the vehicle. In addition, when the brightness detected by the brightness sensor 57 becomes a predetermined threshold or less (when, for example, the sun goes down), front lights of the vehicle may be automatically turned on.

The input device 58 includes, for example, a push button device or a touch panel, and receives a user's input of various pieces of information (e.g. destination) for operating the navigation apparatus 1.

The control unit 59 is a unit which controls the entirety of the navigation apparatus 1 and performs various computations, and includes a CPU (Central Processing Unit) 60, a ROM (Read Only Memory) 61, a RAM (Random Access Memory) 62 or an I/O (Input Output device) 63. In the ROM 61, program constants used in a process of an operation (processing) of the CPU 60 are stored. In the RAM 62, a storage region in which a program or map data is optionally expanded in a process of the operation (processing) of the CPU 60, and a storage region in which a computation result is optionally read and written are prepared.

A language used for audible guidance phrases is set in advance to the navigation apparatus 1 by, for example, the driver. In the ROM 61 or the RAM 62, the language (referred to a "set language" below) set to the navigation apparatus 1 is stored. For the set language, for example, a driver's mother language or a language such as English which is widely used in the world is used.

The I/O 63 is an interface which transmits and receives various pieces of information between the control unit 59 and components (the audio output device 51 to the input device 58) other than the control unit 59. Further, the I/O 63 is the interface which obtains vehicle information (e.g. information indicating a control state of a wiper) from the components of the vehicle other than the navigation apparatus 1.

The CPU 60 executes a program defined in the ROM 61, and performs computation based on the information stored in the ROM 61 and the RAM 62 and the information obtained by the I/O 63. Thus, a function of calculating a route and a function of determining and identifying a brightness are realized by the CPU 60.

Next, a functional configuration realized by the above-described hardware configuration, i.e., the functional configuration of the navigation apparatus 1 will be described with reference to FIG. 2.

An audible guidance unit 11 supports the above-described audio output device 51, and vocally outputs an announcement of a landmark object.

A map information memory 12 (map information obtaining unit) supports the above-described storage device 52, obtains the map information 52*a* in advance from the outside of the navigation apparatus 1 and stores the map information 52*a*.

A current position detector 13 (position obtaining unit) supports the above-described GPS receiver 53 and direction sensor 54, and detects a current position of the vehicle. In this regard, the current position detector 13 corrects the current position of the vehicle detected by the GPS receiver 53 based on the direction detected by the direction sensor 54, and the controller 16 uses the corrected current position of the vehicle.

An input unit 14 (destination obtaining unit) supports the above-described input device 58, and receives a user's setting (input) of a destination of the vehicle.

An environment information obtaining unit 15 obtains environment information related to an environment of the outside of the vehicle. In this regard, the environment information obtaining unit 15 includes a brightness obtaining unit 15*a*, an information communication obtaining unit 15*b*, a vehicle front image obtaining unit 15*c* or a language obtaining unit 15*d*.

The brightness obtaining unit 15*a* supports the above-described brightness sensor 57, and obtains a brightness of the outside of the vehicle.

The information communication obtaining unit 15*b* supports the above-described information communication device 55, and obtains information (referred to as "weather information" below) indicating a weather of the outside of the vehicle or other various pieces of information by way of communication.

The vehicle front image obtaining unit 15*c* supports the above-described camera 56, and obtains an image showing a situation in front of the vehicle. In addition, as described below, the image obtained by the vehicle front image obtaining unit 15*c* is used as information for identifying whether or not there is a visual obstacle (a visual obstacle between the vehicle and a landmark object) in front of the vehicle.

The language obtaining unit 15*d* supports the above-described storage device 52, GPS receiver 53 and control unit 59. This language obtaining unit 15*d* retrieves a region corresponding to a current position of the vehicle detected by the GPS receiver 53 from the above-described region/language associated information stored in the storage device 52, and obtains a main language in the region. A main language of a region corresponding to the current position of the vehicle, i.e., a main language of the region in which the vehicle is positioned will be referred to as a "regional main language" below. In addition, as described below, the regional main language obtained by the language obtaining unit 15*d* is a target for which whether or not the target matches the above-described set language (the language stored in the ROM 61 or the RAM 62) is identified.

The environment information obtaining unit 15 including the above components (the brightness obtaining unit 15*a* to the language obtaining unit 15*d*) obtains the brightness of the outside of the vehicle, weather information of the outside of the vehicle, the image showing the situation in front of the vehicle or the regional main language as environment information.

A controller 16 supports the above-described control unit 59, realizes the function of calculating a route and the function of determining and identifying a brightness and receives an input of vehicle information. In this regard, the controller 16 realizes a function of a route calculation unit 16*a* (route obtaining unit), a route memory 16*b*, a brightness identifying unit 16*c*, a weather identifying unit 16*d*, a vehicle front information identifying unit 16*e*, a language identifying unit 16*f* or an audible guidance phrase selector 16*g*.

The route calculation unit 16*a* calculates a route from a current position to a destination based on the map information 52*a*, the current position of the vehicle detected by the current position detector 13 and the destination received by the input unit 14.

The route memory 16*b* supports the above-described RAM 62, and optionally stores a route calculated by the route calculation unit 16*a*.

The brightness identifying unit 16*c* identifies whether or not the brightness is insufficient for driving. In this regard, the brightness identifying unit 16*c* identifies that the outside of the vehicle is dark (the brightness is insufficient) when the brightness obtained by the brightness obtaining unit 15*a* is a predetermined threshold or less, and identifies that the outside of the vehicle is bright (the brightness is sufficient) when the brightness obtained by the brightness obtaining unit 15*a* is higher than the predetermined threshold.

The weather identifying unit 16*d* extracts weather information from the information received by the information communication obtaining unit 15*b*, and identifies whether or not the weather information indicates a predetermined weather. In addition, to the predetermined weather, weathers such as a heavy rain, a dense fog and a fog which make an eyesight of a driver poor are applied.

The vehicle front information identifying unit 16*e* identifies whether or not there is a visual obstacle in front of the vehicle by analyzing the image obtained by the vehicle front image obtaining unit 15*c* and showing the situation in front of the vehicle. For example, in the vehicle front information identifying unit 16*e*, obstacle data (polygon data or image data indicating a track, a bus or a sign indicating under construction) indicating a visual obstacle is prepared in advance. Further, the vehicle front information identifying unit 16*e* identifies that there is a visual obstacle in front of the vehicle when there is a visual obstacle indicated by obstacle data prepared in advance in the image obtained by the vehicle front image obtaining unit 15*c* and showing the situation in front of the vehicle and when an area which the visual obstacle occupies in the image is a predetermined threshold or more. The vehicle front information identifying unit 16*e* identifies that there is no visual obstacle in other cases, i.e., when there is no visual obstacle indicated by obstacle data prepared in advance, or when an area which the visual obstacle occupies in the image is less than a predetermined threshold. In this regard, that the vehicle front information identifying unit 16*e* identifies whether or not there is a visual obstacle in front of the vehicle is not limited to the above configuration. When, for example, an obstacle is detected in front of the vehicle by using a radar, the vehicle front information identifying unit 16e may identify that there is a visual obstacle in front of the vehicle.

The language identifying unit 16f identifies whether or not the regional main language obtained by the language obtaining unit 15d matches (does not match) the above set language (the language stored in the ROM 61 or the RAM 62).

The audible guidance phrase selector 16g selects an audible guidance phrase from the map information 52a based on one identification result of the brightness identifying unit 16c, the weather identifying unit 16d, the vehicle front information identifying unit 16e and the language identifying unit 16f.

In this regard, the audible guidance phrase includes audio data indicating a name (e.g. proper noun) of a landmark object, and audio data indicating a feature of the landmark object (e.g. external appearance information such as a color, a height and a shape and attribute information such as a bookstore or a flower shop). Further, the audible guidance phrase selector 16g selects one of the audible guidance phrase of the name and the audible guidance phrase of the feature of the landmark object based on one identification result of the brightness identifying unit 16c to the language identifying unit 16f, and causes the audio output device 51 to vocally output the selected audible guidance phrase at a guidance given point.

In addition, in the first embodiment, as described above, the audible guidance phrase selector 16g announces a landmark object by selecting an audible guidance phrase including the audio data included in the map information 52a, and by causing the audible guidance unit 11, which is the audio output device 51, to vocally output the selected audible guidance phrase. Meanwhile, each audible guidance phrase is not limited to an audible guidance phrase including audio data, and may include text data and TTS (Text To Speech) phoneme data which can be converted into audio data from text data. That is, the audible guidance phrase selector 16g may announce a landmark object by selecting text data and TTS phoneme data included in the map information 52a, and by causing a TTS engine, which is the audio output device 51, mounted on the audible guidance unit 11 to vocally output the selected text data and the TTS phoneme data.

According to the above configuration, the controller 16 can cause the audio output device 51 to selectively vocally output one of the name and the feature of the landmark object at the guidance given point, based on the environment information obtained by the environment information obtaining unit 15.

<Operation Related to Brightness of Outside of Vehicle>

FIG. 3 is a flowchart showing an operation related to a brightness of the navigation apparatus 1 according to the first embodiment. The operation related to the brightness of the navigation apparatus 1 according to the first embodiment will be described below with reference to FIG. 3.

First, in step S1, the current position detector 13 detects a current position of the vehicle, and the input unit 14 receives the destination of the vehicle. Further, the route calculation unit 16a calculates a route from a current position to a destination based on the map information 52a, the current position of the vehicle and the destination. Then, the controller 16 calculates a guidance target point based on the calculated route (referred to as a "calculated route" below) and the map information 52a. It is assumed that the driver drives the vehicle after step S1.

In step S2, the current position detector 13 detects the current position of the vehicle.

In step S3, the controller 16 determines whether or not the current position of the vehicle detected in step S2 is a guidance given point of a guidance target point which does not include the landmark object (the guidance given point corresponding to the calculated route). In this regard, when a distance between the current position of the vehicle and the guidance target point which does not include the landmark object is the above-described predetermined distance or less, the controller 16 determines that the current position of the vehicle is the guidance given point of the guidance target point which does not include the landmark object, and the flow moves to step S4. If this is not a case, the flow moves to step S5.

When the flow moves from step S3 to step S4, in step S4, the controller 16 causes the audio output device 51 to vocally output guidance information of the guidance target point (e.g. information such as a direction to travel from the guidance target point or a road name). Subsequently, the flow returns to step S2.

When the flow moves from step S3 to step S5, in step S5, the controller 16 determines whether or not the current position of the vehicle detected in step S2 is a guidance given point of a guidance target point which includes the landmark object (the guidance given point corresponding to the calculated route). In this regard, when a distance between the current position of the vehicle and the guidance target point which includes the landmark object is the above-described predetermined distance or less, the controller 16 determines that the current position of the vehicle is the guidance given point of the guidance target point which includes the landmark object, and the flow moves to step S6. If this is not a case, the flow returns to step S2.

In step S6, the brightness obtaining unit 15a obtains a brightness of the outside of the vehicle. That is, the environment information obtaining unit 15 obtains the brightness of the outside of the vehicle as environment information.

In step S7, the brightness identifying unit 16c (controller 16) identifies whether or not the brightness obtained by the brightness obtaining unit 15a is insufficient for driving. The flow moves to step S8 when the brightness identifying unit 16c identifies that the brightness is insufficient (the brightness obtained by the brightness obtaining unit 15a is the predetermined threshold or less), and the flow moves to step S9 when the brightness identifying unit 16c identifies that the brightness is sufficient (the brightness obtained by the brightness obtaining unit 15a is higher than the predetermined threshold).

In addition, when the threshold used in this step S7 is set to the same value as the threshold for automatically turning on or off the front lights, if the flow moves from step S7 to step S8, the front lights are automatically turned on and, if the flow moves from step S7 to step S9, the front lights are automatically turned off.

In step S8, the controller 16 causes the audio output device 51 to vocally output the name of the landmark object. In addition, in this case, the controller 16 may cause the audio output device 51 to vocally output guidance information of the guidance target point similar to step S4. Subsequently, the flow moves to step S10.

In step S9, the controller 16 causes the audio output device 51 to vocally output a feature (e.g. color) of the landmark object. In addition, in this case, the controller 16 may cause the audio output device 51 to vocally output guidance information of the guidance target point similar to step S4. Subsequently, the flow moves to step S10.

In step S10, the controller 16 determines whether or not the current position of the vehicle detected in step S2 is a destination. The operation shown in FIG. 3 is finished when the controller 16 determines that the current position is the destination, and the flow returns to step S2 when the controller 16 determines that the current position is not the destination.

<Effect>

In, for example, a daytime during which the brightness of the outside of the vehicle is high, the driver can easily recognize the landmark object by visually checking the feature (e.g. color) of the landmark object. Meanwhile, at midnight during which the brightness of the outside of the vehicle is low, the driver has difficulty in visually checking the feature (e.g. color) of the landmark object. However, when a landmark object is a building, characters indicating a name of the building and a signboard of the building are highly likely to be lighted up at midnight. Therefore, it is thought that the driver can recognize the landmark object based on this name as a clue.

Hence, the navigation apparatus 1 according to the first embodiment causes the audio output device 51 to selectively vocally output one of the name and the feature of the landmark object based on the brightness obtained by the brightness obtaining unit 15a (the environment information obtained by the environment information obtaining unit 15). The navigation apparatus 1 vocally outputs the feature (e.g. color) of the landmark object when, for example, the brightness of the outside of the vehicle is high, and vocally outputs the name of the landmark object when the brightness of the outside of the vehicle is low. That is, it is possible to appropriately vocally output the landmark object, so that the driver can easily recognize the landmark object which has been vocally output.

In addition, according to the above-described configuration, when the vehicle arrives at a guidance given point (step S5), the brightness obtained by the brightness obtaining unit 15a (step S6) is used in a step subsequent to step S7. However, the present invention is not limited to this. The brightness obtained by the brightness obtaining unit 15a by the time when the vehicle arrives at a guidance given point (before the vehicle arrives at the guidance given point or when the vehicle arrives at the guidance given point) only needs to be used in the step subsequent to step S7. For example, the brightness obtaining unit 15a may be configured to repeatedly obtain and update a brightness before the vehicle arrives at a guidance given point (before step S5), and use the brightness obtained when the vehicle arrives at the guidance given point in the step subsequent to step S7.

Further, a configuration of applying the brightness detected by the brightness sensor 57 to environment information has been described above. However, the present invention is not limited to this. For example, instead of the above-described brightness, a state where the front lights switched by a manual operation of the driver are turned on or off may be configured to be applied to environment information. According to this configuration, the brightness sensor 57 is not indispensable.

<Operation Related to Weather Information of Outside of Vehicle>

Figure 4:
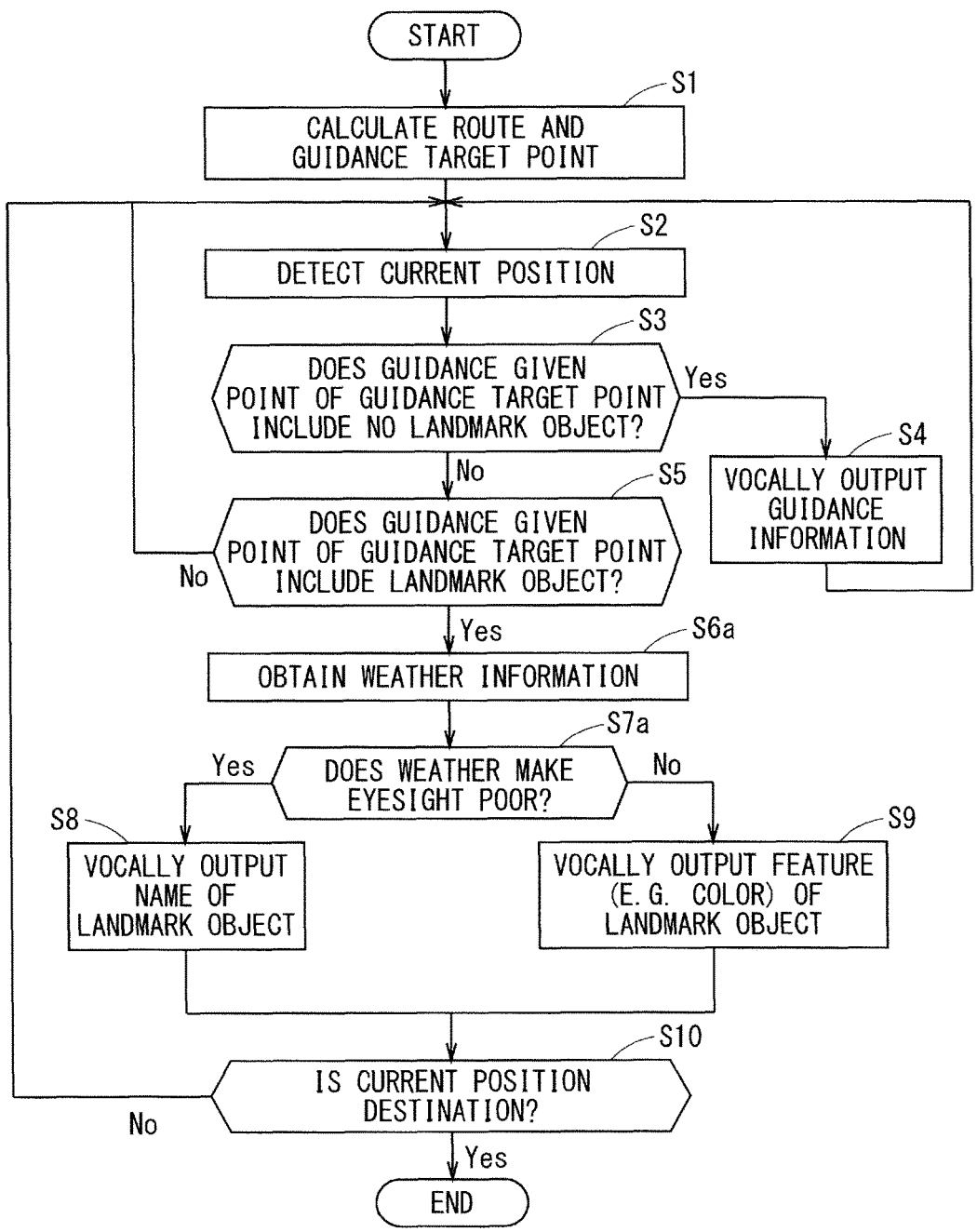
FIG. 4 is a flowchart showing an operation of the navigation apparatus according to the first embodiment.

FIG. 4 is a flowchart showing an operation related to weather information of the navigation apparatus 1 according to the first embodiment. The operation related to the weather information of the navigation apparatus 1 according to the first embodiment will be described below with reference to FIG. 4. In addition, the flowchart shown in FIG. 4 is a flowchart in which steps S6 and S7 of the flowchart shown in FIG. 3 are changed to steps S6a and S7a. Hence, only steps S6a and S7a will be described below.

In step S6a, the information communication obtaining unit 15b obtains weather information of the outside of the vehicle. That is, the environment information obtaining unit 15 obtains the weather information of the outside of the vehicle as environment information.

In step S7a, the weather identifying unit 16d (controller 16) identifies whether or not the weather information obtained by the information communication obtaining unit 15b indicates a predetermined weather, i.e., a weather which makes an eyesight poor. The flow moves to step S8 when the weather identifying unit 16d identifies that the weather information indicates the weather which makes the eyesight poor, and moves to step S9 when the weather information does not indicate this weather.

<Effect>

On, for example, a fine day during which the eyesight does not become poor, the driver can easily recognize the landmark object by visually checking the feature (e.g. color) of the landmark object. Meanwhile, during a heavy rain which makes the eyesight poor, the driver can recognize only a partial feature of a landmark object. As a result, the driver erroneously recognizes as the landmark object another building which has the partial feature. However, even in case of a heavy rain, since the driver is notified in advance of a name such as a proper noun of a landmark object, the driver can recall an entire image of the landmark object and, consequently, can avoid the above erroneous recognition.

Hence, the navigation apparatus 1 according to the first embodiment causes the audio output device 51 to selectively vocally output one of the name and the feature of the landmark object based on the weather information obtained by the information communication obtaining unit 15b (the environment information obtained by the environment information obtaining unit 15). The navigation apparatus 1 vocally outputs a feature (e.g. color) of a landmark object when, for example, a weather of the outside of the vehicle is a weather which does not make the eyesight poor, and vocally outputs a name of the landmark object when the weather of the outside of the vehicle is a weather which makes the eyesight poor. That is, it is possible to appropriately vocally output the landmark object, so that the driver can correctly recognize the landmark object which has been vocally output.

In addition, according to the above-described configuration, when the vehicle arrives at a guidance given point (step S5), the weather information obtained by the information communication obtaining unit 15b (step S6a) is used in a step subsequent to step S7a. However, the present invention is not limited to this. The weather information obtained by the information communication obtaining unit 15b by the time when the vehicle arrives at a guidance given point (before the vehicle arrives at the guidance given point or when the vehicle arrives at the guidance given point) only needs to be used in the step subsequent to step S7a. For example, the information communication obtaining unit 15b may be configured to repeatedly obtain and update weather information before the vehicle arrives at a guidance given point, for example, at a time of activation (before step S5), and use the weather information obtained when the vehicle arrives at the guidance given point in the step subsequent to step S7a.

Further, a configuration of applying the weather information received by the information communication device 55 to environment information has been described above. However, the present invention is not limited to this. Instead of the above-described weather information, for example, the image generated by the camera 56 or a control state of a wiper may be configured to be applied to environment information. More specifically, the navigation apparatus 1 may vocally output a name of a landmark object in case of a control state where the wiper is operated, and vocally output a feature (e.g. color) of the landmark object in case of a control state where the wiper is not operated. According to this configuration, the information communication device 55 is not indispensable.

<Operation Related to Image Showing Situation in Front of Vehicle>

Figure 5:
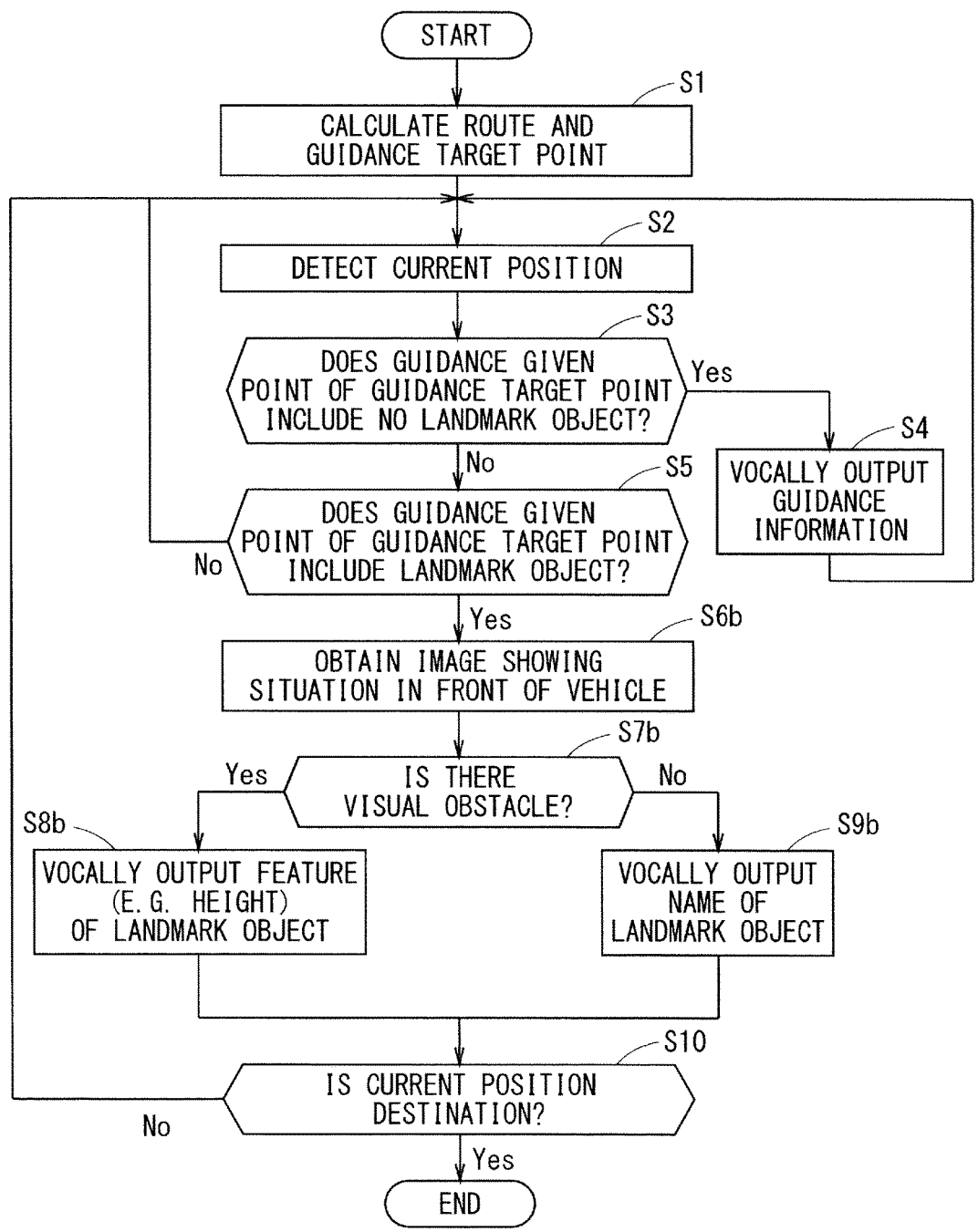
FIG. 5 is a flowchart showing an operation of the navigation apparatus according to the first embodiment.

FIG. 5 is a flowchart showing an operation related to an image showing a situation in front of the vehicle of the navigation apparatus 1 according to the first embodiment. The operation related to the image showing the situation in front of the vehicle of the navigation apparatus 1 according to the first embodiment will be described below with reference to FIG. 5. In addition, the flowchart shown in FIG. 5 is a flowchart in which steps S6 to S9 of the flowchart shown in FIG. 3 are changed to steps S6b to S9b. Hence, only steps S6b to S9b will be described below.

In step S6b, the vehicle front image obtaining unit 15c obtains an image showing the situation in front of the vehicle. That is, the environment information obtaining unit 15 obtains the image showing the situation in front of the vehicle as environment information.

In step S7b, the vehicle front information identifying unit 16e (controller 16) identifies whether or not there is a visual obstacle in front of the vehicle by analyzing the image obtained by the vehicle front image obtaining unit 15c and showing the situation in front of the vehicle. The flow moves to step S8b when the vehicle front information identifying unit 16e identifies that there is the visual obstacle, and moves to step S9b when the vehicle front information identifying unit 16e identifies that there is not the visual obstacle.

In step S8b, the controller 16 causes the audio output device 51 to vocally output a feature (e.g. height) of the landmark object. In addition, in this case, the controller 16 may cause the audio output device 51 to vocally output guidance information of the guidance target point. Subsequently, the flow moves to step S10.

In step S9b, the controller 16 causes the audio output device 51 to vocally output the name of the landmark object. In addition, in this case, the controller 16 may cause the audio output device 51 to vocally output guidance information of the guidance target point. Subsequently, the flow moves to step S10.

<Effect>

It is thought, when, for example, there is a visual obstacle in front of the vehicle, even if a name of a landmark object is vocally output, the driver has difficulty in visually checking the name. However, it is thought that, even when there is a visual obstacle, if that the landmark object is high is known in advance, the driver can recognize the landmark object by using as a clue an upper portion of the landmark object which appears from an outline of the visual obstacle.

Hence, the navigation apparatus 1 according to the first embodiment causes the audio output device 51 to selectively vocally output one of the name and the feature of the landmark object based on the image obtained by the vehicle front image obtaining unit 15c and showing a situation in front of the vehicle (the environment information obtained by the environment information obtaining unit 15). For example, the navigation apparatus 1 vocally outputs the feature (e.g. height) of the landmark object when, for example, there is a visual obstacle in front of the vehicle, and vocally outputs the name of the landmark object when there is no visual obstacle in front of the vehicle. That is, it is possible to appropriately vocally output the landmark object, so that the driver can quickly recognize the landmark object which has been vocally output.

In addition, according to the above-described configuration, instead of causing the audio output device 51 to vocally output a feature of a landmark object, the controller 16 may cause the audio output device 51 to vocally output a feature of a facility near the landmark object or a point (e.g. a building adjacent to a hither side of the landmark object or a large park adjacent to a far side of the landmark object). According to this configuration, the driver can quickly recognize the landmark object which has been vocally output.

<Operation Related to Regional Main Language>

Figure 6:
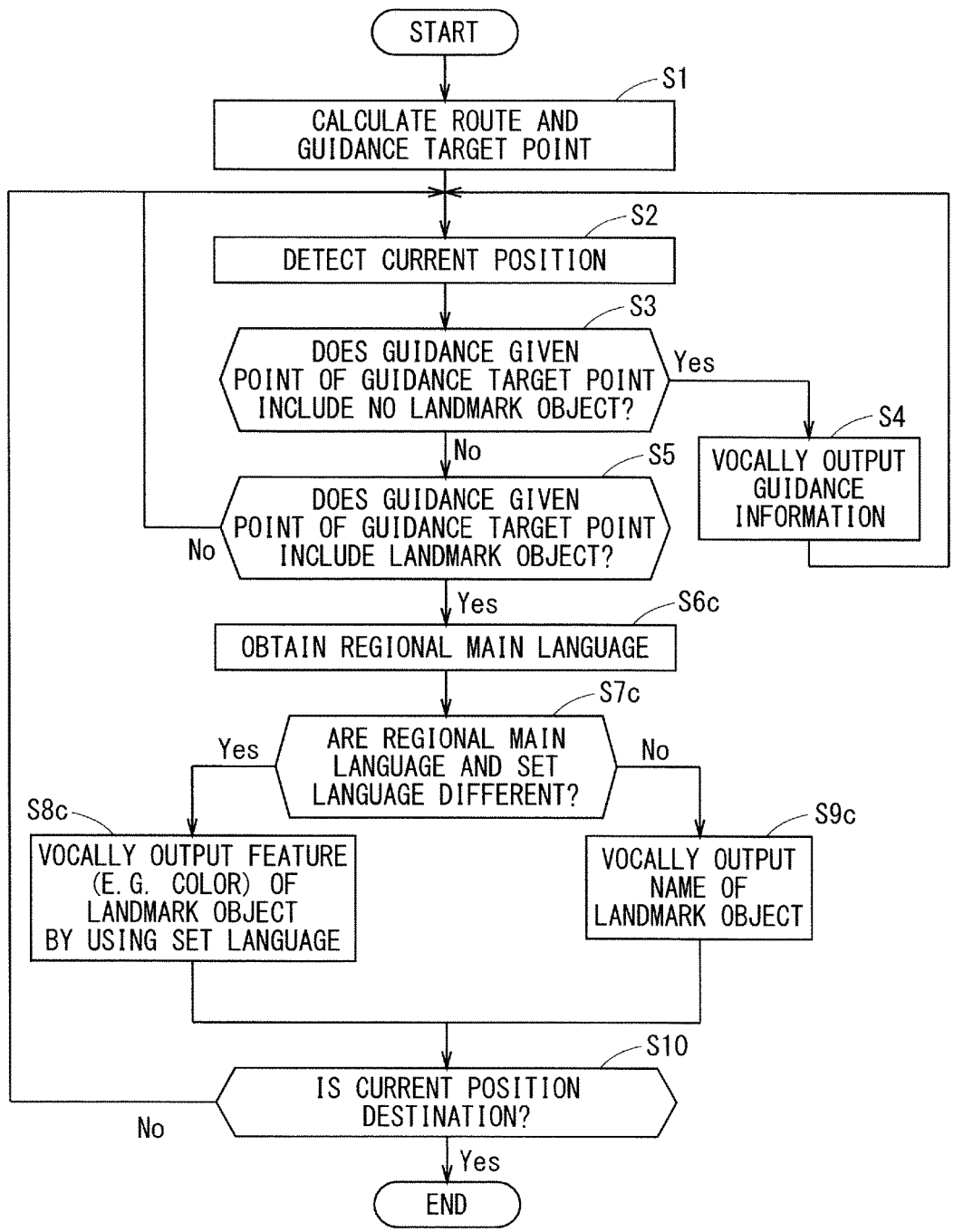
FIG. 6 is a flowchart showing an operation of the navigation apparatus according to the first embodiment.

FIG. 6 is a flowchart showing an operation related to a regional main language of the navigation apparatus 1 according to the first embodiment. The operation related to the regional main language of the navigation apparatus 1 according to the first embodiment will be described below with reference to FIG. 6. In addition, the flowchart shown in FIG. 6 is a flowchart in which steps S6 to S9 of the flowchart shown in FIG. 3 are changed to steps S6c to S9c. Hence, only steps S6c to S9c will be described below.

In step S6c, the language obtaining unit 15d obtains the above-described regional main language (a language mainly used in a region corresponding to the current position of the vehicle). That is, the environment information obtaining unit 15 obtains the regional main language as environment information.

In step S7c, the language identifying unit 16f (controller 16) identifies whether or not the regional main language obtained by the language obtaining unit 15d does not match the above-described set language (the language stored in the ROM 61 or the RAM 62). The flow moves to step S8c when the language identifying unit 16f identifies that the regional main language does not match the above-described set language, and moves to step S9c when the regional main language matches the above-described set language.

In step S8c, the controller 16 causes the audio output device 51 to vocally output a feature (e.g. color) of the landmark object by using the set language. In addition, in this case, the controller 16 may cause the audio output device 51 to vocally output guidance information of the guidance target point. Subsequently, the flow moves to step S10.

In step S9c, the controller 16 causes the audio output device 51 to vocally output the name of the landmark object. In addition, in this case, the controller 16 may cause the audio output device 51 to vocally output guidance information of the guidance target point. Subsequently, the flow moves to step S10.

<Effect>

It is though that, when, for example, a traveler travels to a region (country) in which a language other than a mother language is used, the regional main language does not match the set language. In such a case, it is assumed that, even when the name of the landmark object is vocally output by using a main language of this region, the driver cannot hear the name or read characters given to the landmark object. However, it is thought that, when the feature of the landmark object is notified in advance by using the set language (the mother tongue of the driver or a language such as English which is widely used in the world), the driver can recognize the landmark object by using this feature as a clue.

Hence, the navigation apparatus 1 according to the first embodiment causes the audio output device 51 to selectively vocally output one of the name and the feature of the landmark object based on the regional main language obtained by the language obtaining unit 15d (the environment information obtained by the environment information obtaining unit 15). For example, the navigation apparatus 1 vocally outputs the feature (e.g. color) of the landmark object by using the set language when, for example, the regional main language does not match the set language, and vocally outputs the name of the landmark object when the regional main language matches the set language. That is, it is possible to appropriately vocally output the landmark object, so that the driver can easily recognize the landmark object which has been vocally output.

Modified Example 1

When map information 52a is not updated, a building which is a landmark object of a guidance target point on the map information 52a has already been removed or has been changed to another building. In such a case, it is not preferable to announce (vocally output) a landmark object based on the map information 52a. Hence, a navigation apparatus 1 according to a modified example 1 of the present invention can stop announcing (vocally outputting) the landmark object when the map information 52a is not appropriate.

Figure 7:
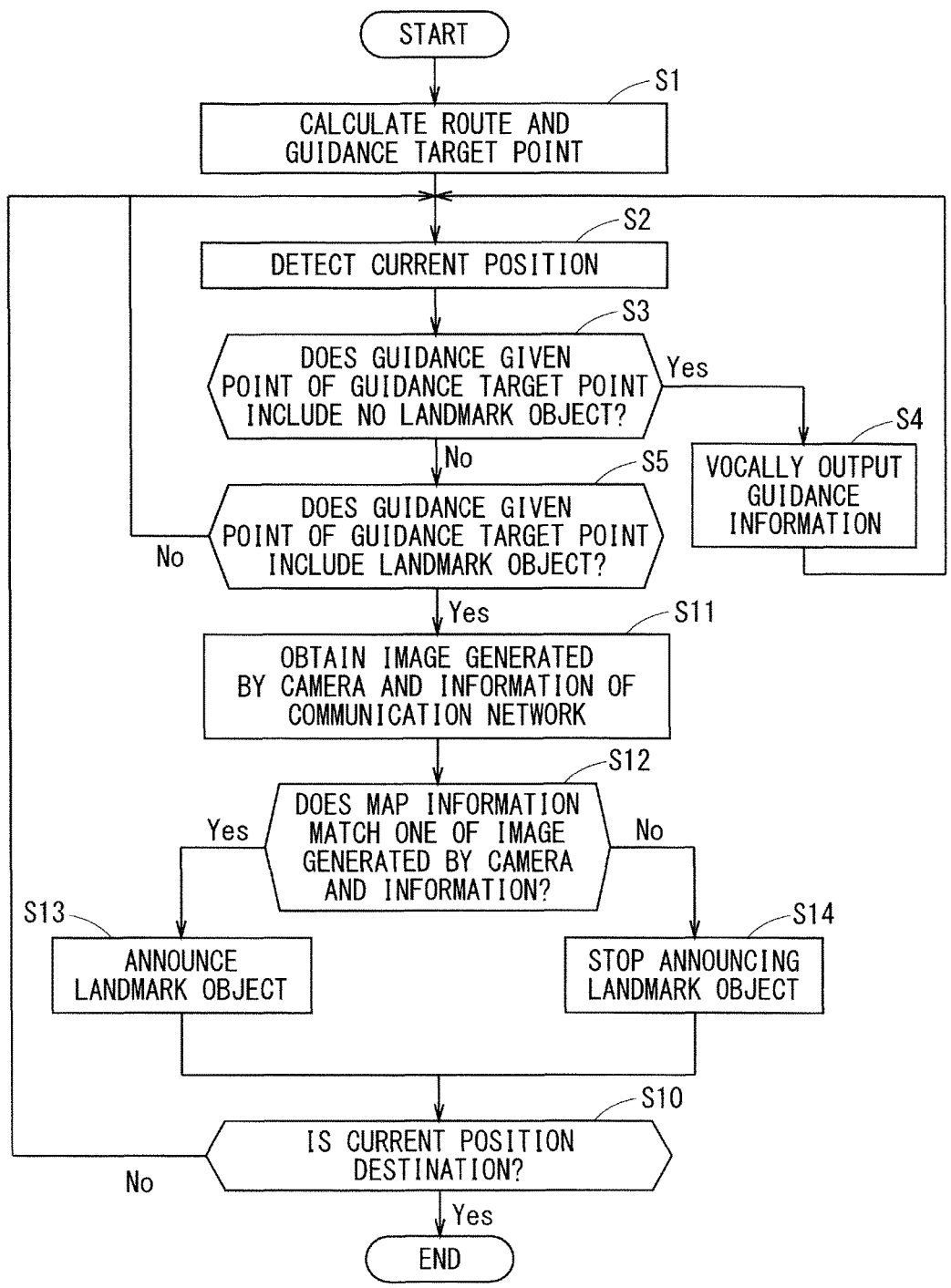
FIG. 7 is a flowchart showing an operation of a navigation apparatus according to a modified example 1.

FIG. 7 is a flowchart showing an operation of the navigation apparatus 1 according to the modified example 1. The operation of the navigation apparatus 1 according to the modified example 1 will be described below with reference to FIG. 7. In addition, steps S1 to S5 and S10 of the flowchart shown in FIG. 7 are the same as steps S1 to S5 and S10 of the flowchart shown in FIG. 3 and therefore only steps S11 to S14 other than steps S1 to S5 and S10 will be described.

In step S11 after step S5, a camera 56 (a vehicle front image obtaining unit 15c) generates (obtains) an image showing the situation in front of a vehicle. Further, an information communication obtaining unit 15b obtains information equivalent to the map information 52a from a communication network. As described above, an environment information obtaining unit 15 obtains the image generated by the camera 56, and information from the communication network.

In step S12, a controller 16 determines for the landmark object whether or not the map information 52a matches the image generated by the camera 56. In addition, the controller 16 determines for the landmark object whether or not the map information 52a matches the information from the communication network.

In addition, a method of determining whether or not the map information 52a matches the image generated by the camera 56 is configured to, for example, include in the map information 52a scenery data (e.g. image data or polygon data) showing a scenery seen in an extension direction of a route from each point of the route. Further, a method includes causing the controller 16 to determine as described above whether or not, in regard to characters, signboards and colors given to a landmark object, the scenery data included in the map information 52a and the image generated by the camera 56 match.

Furthermore, the method of determining whether or not the map information 52a and the information from the communication network is, for example, a method of causing the controller 16 to perform the above-described determination depending on whether names of a landmark object of the map information 52a matches the information from the communication network.

In case that it is determined in above-described step S12 that the map information 52a matches the image generated by the camera 56, in case that it is determined that the map information 52a matches the information from the communication network or in both of these cases, the flow moves to step S13. Meanwhile, when it is determined that the map information 52a does not match the image generated by the camera 56, and the map information 52a does not match the information from the communication network, the flow moves to step S14.

In step S13, the controller 16 announces (vocally outputs) the landmark object based on environment information described in the first embodiment. In addition, in this case, the controller 16 may vocally output guidance information of a guidance target point, too. Subsequently, the flow moves to step S10.

In step S14, the controller 16 stops announcing (vocally outputting) the landmark object based on the environment information described in the first embodiment. In this regard, the controller 16 may vocally output guidance information of the guidance target point. Subsequently, the flow moves to step S10.

In the navigation apparatus 1 according to the modified example 1 employing the above configuration, the controller 16 stops vocally outputting a name and a feature of a landmark object based on a determination result as to whether or not the map information 52a matches an image obtained by the camera 56, and a determination result as to whether or not the map information 52a matches information from the communication network. In this regard, the image generated by the camera 56 and the information from the communication network are generally newer and more appropriate than the map information 52a. Consequently, when the map information 52a does not match the image generated by the camera 56 and is not appropriate, announcing (vocally outputting) the landmark object is stopped, so that it is possible to appropriately announce the landmark object.

In addition, as described above, in step S11, the environment information obtaining unit 15 obtains the image generated by the camera 56 and the information from the communication network, and, in step S12, the controller 16 stops vocally outputting a name and a feature of a landmark object based on a determination result as to whether or not the map information 52a matches an image obtained by the camera 56, and a determination result as to whether or not the map information 52a matches the information from the communication network. However, the present invention is not limited to this. For example, in step S11, the environment information obtaining unit 15 may obtain the image generated by the camera 56 without obtaining the information from the communication network and, in step S12, the controller 16 may stop vocally outputting of a name and a feature of a landmark object based on a determination result as to whether or not the map information 52a matches the image generated by the camera 56. Further, for example, in step S11, the environment information obtaining unit 15 may obtain the information from the communication network without obtaining the image generated by the camera 56, and, in step S12, the controller 16 may stop vocally outputting a name and a feature of a landmark object based on a determination result as to whether or not the map information 52a matches the information from the communication network.

Modified Example 2

According to the configurations described above in the first embodiment and the modified example 1, when a feature of a landmark object is vocally output (step S9 in FIGS. 3 and 4, step S8b in FIG. 5 and step S8c in FIG. 6), only one feature of the landmark object may be vocally output or a plurality of features may be vocally output.

In this regard, when all of a plurality of features are vocally output, the features need to be vocally output quite before a guidance target point. Therefore, a driver has difficulty in recognizing a landmark object to the contrary. Hence, in a modified example 2 of the present invention, it is possible to limit features which are vocally output.

Figure 8:
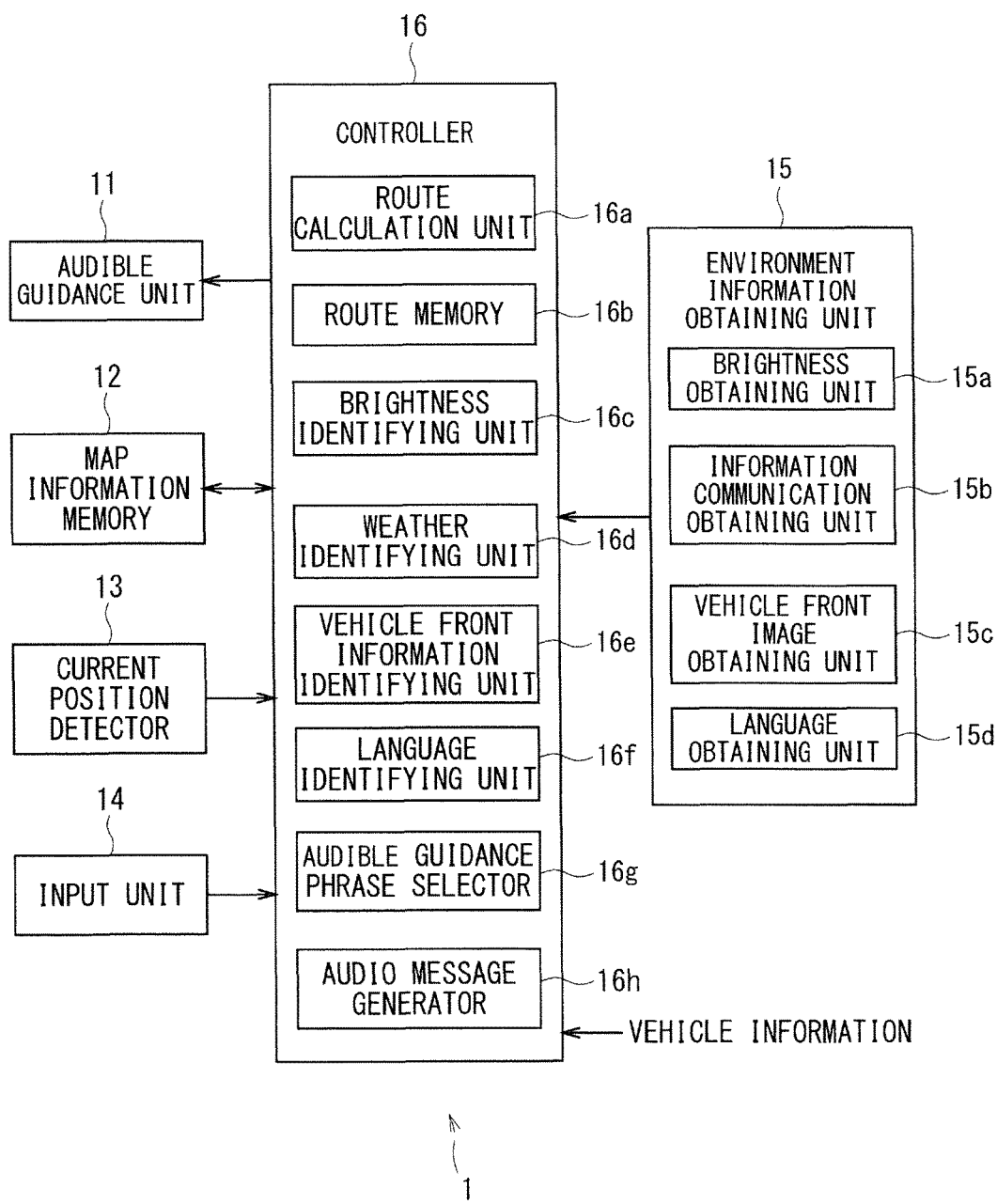
FIG. 8 is a block diagram showing an example of a functional configuration of a navigation apparatus according to a modified example 2.

FIG. 8 is a block diagram showing an example of a functional configuration of a navigation apparatus 1 according to the modified example 2. As shown in this FIG. 8, the navigation apparatus 1 according to the modified example 2 employs the above-described configuration of the first embodiment to which an audio message generator 16h is added. In this regard, components other than an audible guidance phrase selector 16g and the audio message generator 16h are the same as those of the first embodiment, and therefore only the audible guidance phrase selector 16g and the audio message generator 16h will be described below.

The audible guidance phrase selector 16g determines whether or not there is a plurality of audible guidance phrases indicating features of one landmark object when the features of the one landmark object are vocally output. When determining that there is a plurality of audible guidance phrases, the audible guidance phrase selector 16g selects at least one of a plurality of audible guidance phrases based on a predetermined priority.

In the following description, the audible guidance phrase selector 16g selects N upper audible guidance phrases according to the priority. Further, the priority is in order of shorter audible guidance phrases.

That is, in the following description, the audible guidance phrase selector 16g selects the N upper short audible guidance phrases when there is a plurality of audible guidance phrases indicating features of one landmark object. In addition, a value of N is an initial value of a device (system) or is set in advance by a driver. When N=1 is set, the audible guidance phrase selector 16g selects the shortest phrase of a plurality of audible guidance phrases.

When the audible guidance phrase selector 16g selects the N (where N≥2) audible guidance phrases, the audio message generator 16h generates an audio message by combining the N audible guidance phrases. Further, the audio message generator 16h causes an audio output device 51 to output the generated audio message at a guidance given point.

Thus, the controller 16 can cause the audio output device 51 to vocally output at least one of a plurality of features based on a predetermined priority when the landmark object for which a vocal output is given includes a plurality of features.

FIG. 9 is a flowchart showing an operation of the navigation apparatus 1 according to the modified example 2. The operation of the navigation apparatus 1 according to the modified example 2 will be described below with reference to FIG. 9. In addition, this operation is performed as steps S9, S8b and S8c.

First, in step S21, a controller 16 determines whether or not there is a plurality of audible guidance phrases indicating features of one landmark object whose features are to be announced (vocally output). The flow moves to step S22 when it is determined that there is not a plurality of audible guidance phrases (i.e. there is one feature), and moves to step S23 when it is determined that there is a plurality of audible guidance phrases (i.e. there is a plurality of features). Meanwhile, even when there is a plurality of audible guidance phrases, if N=1 is set, the flow moves to step S22.

In step S22, the controller 16 causes an audio output device 51 to vocally output an audible guidance phrase indicating one feature. Subsequently, the operation shown in FIG. 9, i.e., the operation in steps S9, S8b and S8c is finished.

In step S23, the controller 16 combines the N (N≥2) upper short audible guidance phrases among audible guidance phrases indicating a plurality of features, and causes the audio output device 51 to vocally output the audio message generated by that combination. Subsequently, the operation shown in FIG. 9, i.e., the operation in steps S9, S8b and S8c is finished.

The above navigation apparatus 1 according to the modified example 2 can limit features which are vocally output, and, consequently, can appropriately vocally output a landmark object.

In addition, that the priority is in order of shorter audible guidance phrases has been described above. However, the present invention is not limited to this. For example, a priority may be defined with respect to types of features such as a color, a height and a shape. Further, this priority may be defined only with respect to specific environment information (e.g. a regional main language) and may be further defined only to a specific region (country) in this case. Furthermore, information related to the priority may be stored in a table format in a storage device 52.

Modified Example 3

Figure 10:
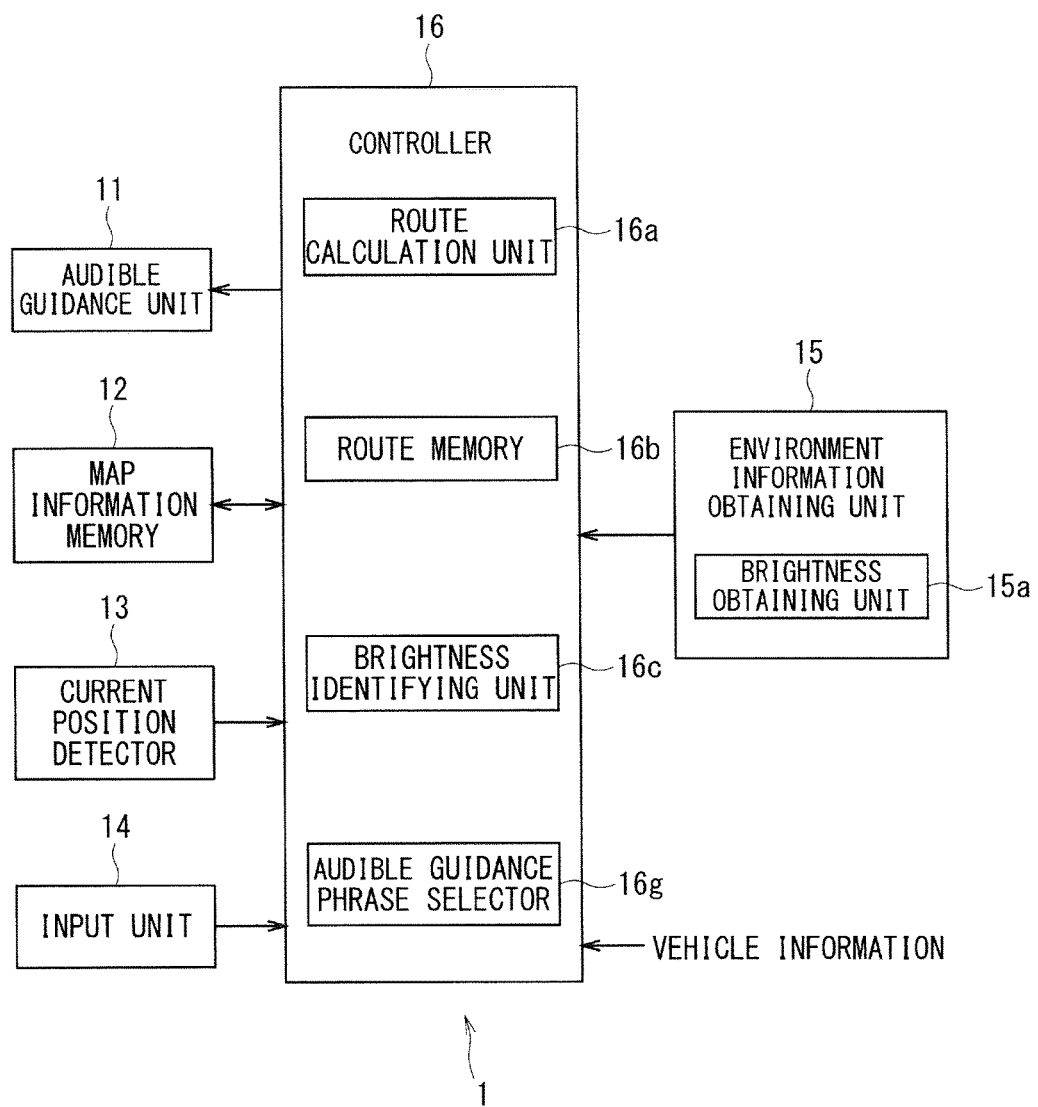
FIG. 10 is a block diagram showing an example of a functional configuration of a navigation apparatus according to a modified example 3.

A modified example 3 assumes a configuration obtained by removing an information communication obtaining unit 15b, a vehicle front image obtaining unit 15c, a language obtaining unit 15d, a weather identifying unit 16d, a vehicle front information identifying unit 16e and a language identifying unit 16f from the configuration shown in FIG. 2 as shown in FIG. 10. A navigation apparatus 1 shown in FIG. 10 can perform an operation related to a brightness of an outside of a vehicle described with reference to FIG. 3.

Modified Example 4

Figure 11:
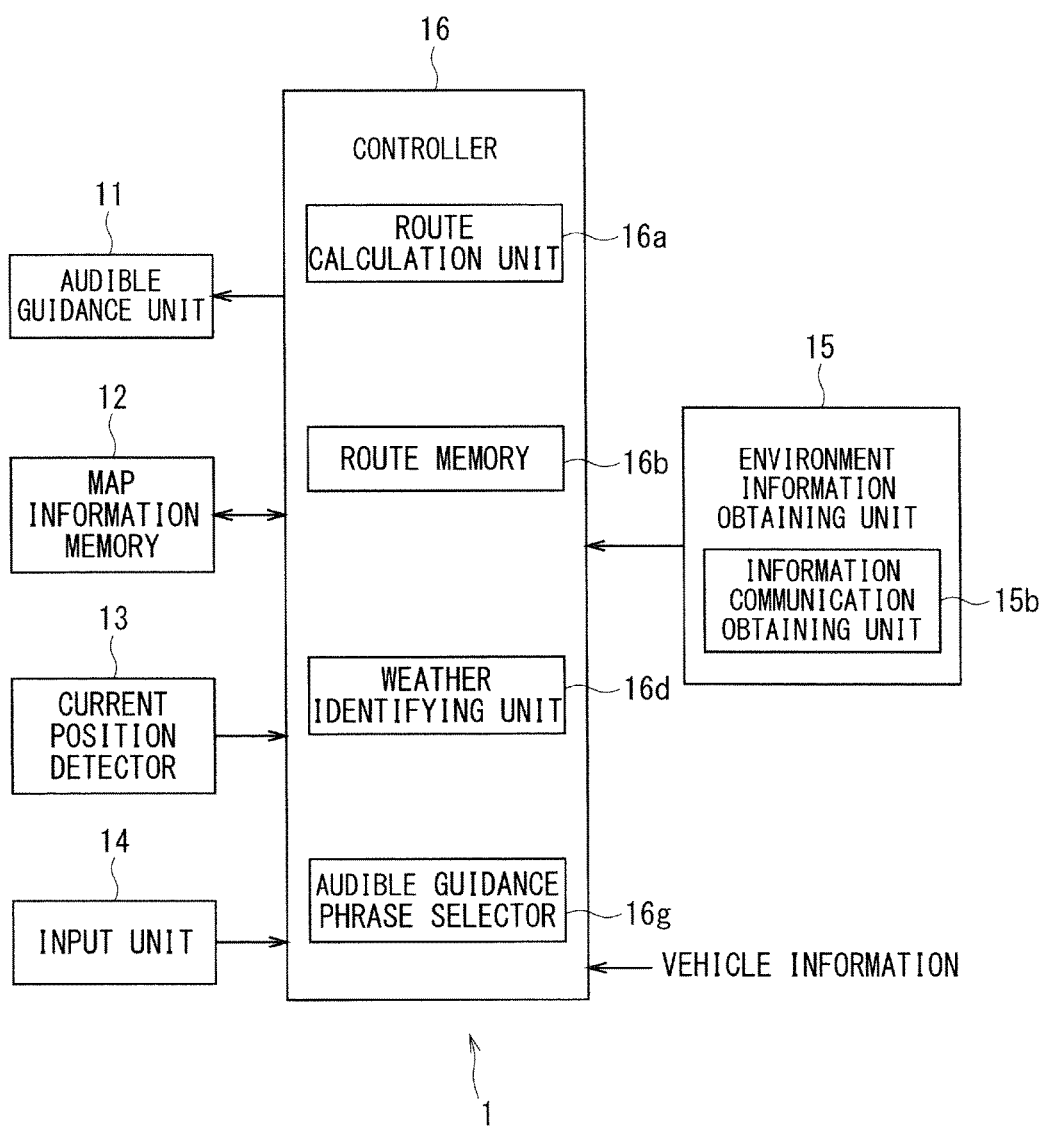
FIG. 11 is a block diagram showing an example of a functional configuration of a navigation apparatus according to a modified example 4.

A modified example 4 assumes a configuration obtained by removing a brightness obtaining unit 15a, a vehicle front image obtaining unit 15c, a language obtaining unit 15d, a brightness identifying unit 16c, a vehicle front information identifying unit 16e and a language identifying unit 16f from the configuration shown in FIG. 2 as shown in FIG. 11. A navigation apparatus 1 shown in FIG. 11 can perform an operation related to weather information of an outside of a vehicle described with reference to FIG. 4.

Modified Example 5

Figure 12:
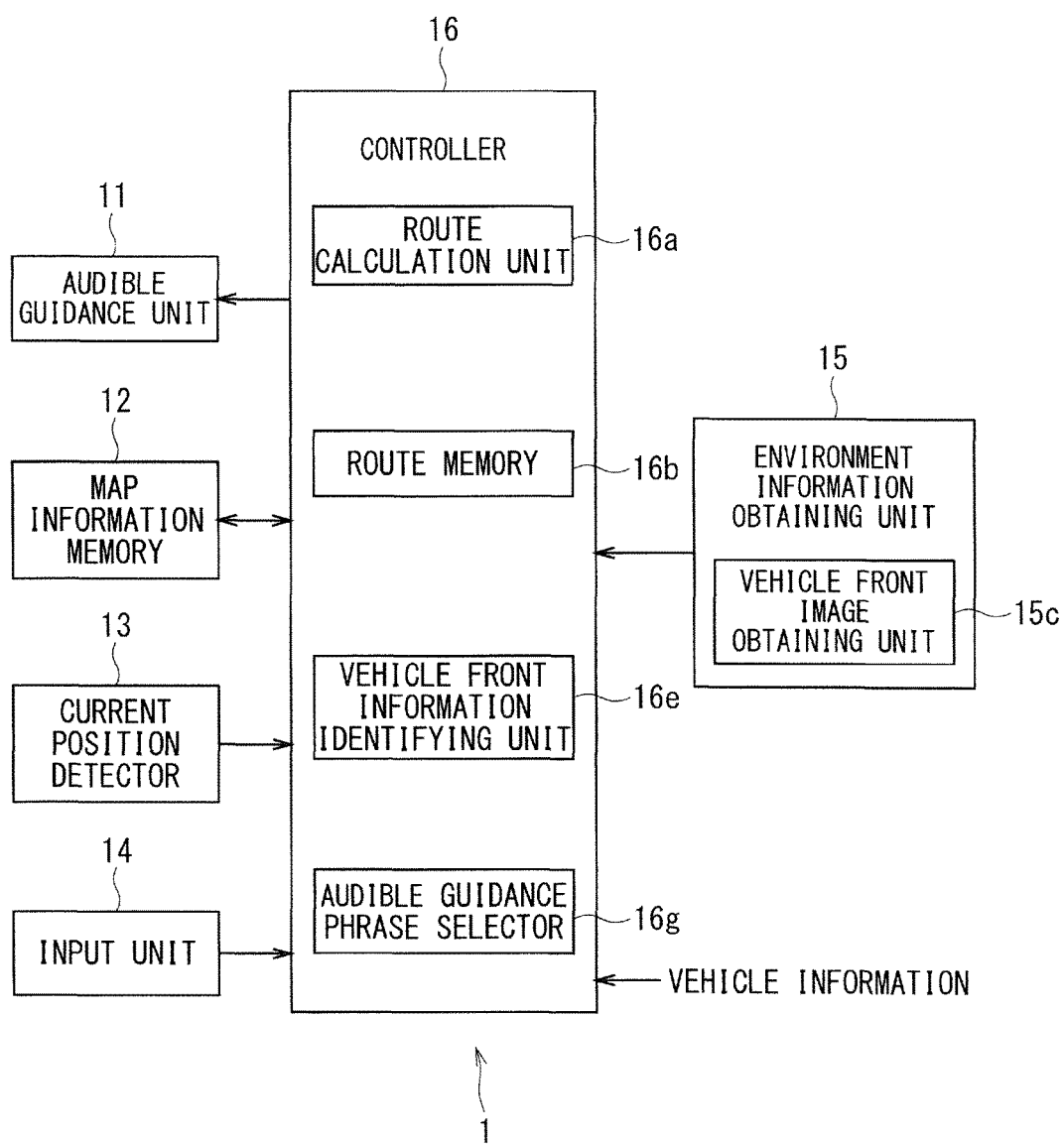
FIG. 12 is a block diagram showing an example of a functional configuration of a navigation apparatus according to a modified example 5.

A modified example 5 assumes a configuration obtained by removing a brightness obtaining unit 15a, an information communication obtaining unit 15b, a language obtaining unit 15d, a brightness identifying unit 16c, a weather identifying unit 16*d* and a language identifying unit 16*f* from the configuration shown in FIG. 2 as shown in FIG. 12. A navigation apparatus 1 shown in FIG. 12 can perform an operation related to an image showing a situation in front of a vehicle described with reference to FIG. 5.

Modified Example 6

A modified example 6 assumes a configuration obtained by removing a brightness obtaining unit 15*a*, an information communication obtaining unit 15*b*, a vehicle front image obtaining unit 15*c*, a brightness identifying unit 16*c*, a weather identifying unit 16*d* and a vehicle front information identifying unit 16*e* from the configuration shown in FIG. 2 as shown in FIG. 13. A navigation apparatus 1 shown in FIG. 13 can perform an operation related to a regional main language described with reference to FIG. 6.

Modified Example 7

In the first embodiment, a controller 16 may cause an audio output device to selectively vocally output one of a name and a feature of a landmark object based on an identification result of each of a brightness identifying unit 16*c* to a language identifying unit 16*f*.

However, the present invention is not limited to this. The controller 16 may cause the audio output device to selectively vocally output one of a name and a feature of a landmark object based on all identification results of the brightness identifying unit 16*c* to the language identifying unit 16*f*. The controller 16 may be configured to, when, for example, the number of identification results for vocally outputting features among a plurality of identification results obtained by the brightness identifying unit 16*c* to the language identifying unit 16*f* is the number of identification results for vocally outputting a name or more, cause the audio output device to vocally output the features of a landmark object, and cause the audio output device to vocally output the name of the landmark object if this is not a case.

More specifically, it is assumed that an identification result which causes the flow to move from step S7 to step S8 in FIG. 3 (an identification result for vocally outputting a name) is obtained, an identification result which causes the flow to move from step S7*a* to step S9 in FIG. 4 (an identification result for vocally outputting features) is obtained, and an identification result which causes the flow to move from step S7*b* to step S8*b* in FIG. 5 (identification information for vocally outputting features) is obtained. In this case, the number (2) of identification results for vocally outputting features is the number of (1) of identification results for vocally outputting a name or more, and the controller 16 causes an audio output device 51 to vocally output the features of the landmark object.

Modified Example where Movement Support Apparatus is Applied to Other than Navigation Apparatus The movement support apparatus described above is applicable not only to the navigation apparatus 1 mounted on a vehicle but also to a movement support apparatus which can be mounted on a vehicle and is constructed as a system by optionally combining a PND (Portable Navigation Device), a mobile terminal (e.g. a mobile telephone, a smartphone and a tablet) and a server. In this case, each function or each component of the navigation apparatus 1 described above is provided in a distributed arrangement in each device which constructs the system.

For example, a configuration where the movement support apparatus is applied to the navigation apparatus 1 has been described above. However, the movement support apparatus is not limited to this, and may be applied to one of a PND, a mobile terminal and a server.

Further, a configuration where a map information memory 12 which obtains map information 52*a* from an outside of the navigation apparatus 1 and stores the map information 52*a* is applied to a map information obtaining unit has been described above. However, the map information obtaining unit is limited to the map information memory 12 as long as the map information obtaining unit obtains the map information 52*a*, and may be, for example, a communication unit configured to receive the map information 52*a*. Further, when, for example, a movement support apparatus is applied to a smartphone, a memory equivalent to the map information memory 12 among components of the smartphone may be applied to the map information obtaining unit. Furthermore, when, for example, a movement support apparatus is applied to a server, a memory equivalent to the map information memory 12 among components of the server may be applied to the map information obtaining unit.

Still further, a configuration where a current position detector 13 which detects a current position of a vehicle is applied to a position obtaining unit has been described above. However, the position obtaining unit is not limited to the current position detector 13 as long as the position obtaining unit obtains a position of a vehicle of interest. When, for example, a movement support apparatus is applied to a smartphone, a detector equivalent to the current position detector 13 among components of the smartphone may be applied to the position obtaining unit. Further, when, for example, the movement support apparatus is applied to the server, a communication unit which receives a position of a vehicle of interest among components of the server may be applied to the position obtaining unit.

Furthermore, a configuration where an input unit 14 which receives a setting (input) of a destination of a vehicle of interest from a user is applied to a destination obtaining unit has been described above. However, the destination obtaining unit is not limited to the input unit 14 as long as the destination obtaining unit obtains a destination of a vehicle of interest. When, for example, a movement support apparatus is applied to a smartphone, an input unit equivalent to the input unit 14 among components of the smartphone may be applied to the destination obtaining unit. Further, when, for example, a movement support apparatus is applied to a server, a communication unit which receives a destination of a vehicle of interest among components of the server may also be applied to the destination obtaining unit. In addition, the same modified example as that of the input unit 14 is applicable to an environment information obtaining unit 15, too.

Further, a configuration where a route calculation unit 16*a* which calculates a route from a current position to a destination based on the map information 52*a*, and a position and a destination of a vehicle of interest is applied to a route obtaining unit has been described above. However, the route obtaining unit is not limited to the route calculation unit 16*a* as long as the route obtaining unit obtains a route calculated based on the map information 52*a* and a position and a destination of a vehicle of interest, and may be a communication unit which receives, for example, the above route from a server. Further, when, for example, a movement support apparatus is applied to a smartphone, a calculation unit equivalent to the route calculation unit 16*a* among components of the smartphone may be applied to the route obtaining unit. Furthermore, when, for example, a movement support apparatus is applied to a server, a calculation unit equivalent to the route calculation unit 16*a* among components of the server may be applied to the route obtaining unit.

Still further, a configuration where the audio output device 51 of the navigation apparatus 1 is applied to an audio output device has been described above. However, the audio output device is not limited to the audio output device 51 of the navigation apparatus 1 as long as the audio output device can give a vocal output, and an audio output device equivalent to the audio output device 51 among components of a smartphone may be applied. Further, a case where a moving body is a vehicle has been described above. However, the present invention is not limited to this and the moving body is not limited to a person.

In addition, according to the present invention, embodiments can be optionally modified or omitted without departing from the scope of the invention.

The present invention has been described in detail. However, the above description is an illustrative description in all aspects and the present invention is by no means limited to this. It is understood that an infinite number of modified examples which are not illustrated is assumed without departing from the scope of the present invention.

REFERENCE SIGNS LIST

1 NAVIGATION APPARATUS
12 MAP INFORMATION MEMORY
13 CURRENT POSITION DETECTOR
14 INPUT UNIT
15 ENVIRONMENT INFORMATION OBTAINING UNIT
16 CONTROLLER
16*a* ROUTE CALCULATION UNIT
51 AUDIO OUTPUT DEVICE

The invention claimed is:

1. A movement support apparatus that supports movement of a moving body by causing an audio output device that moves with said moving body to vocally output an announcement of a landmark object, the movement support apparatus comprising:
   a processor to execute a program; and
   a memory to store the program which, when executed by the processor, results in performance of steps comprising,
      obtaining map information;
      obtaining a position of said moving body;
      obtaining a destination of said moving body;
      obtaining a route to said destination retrieved based on said map information, the position of said moving body and the destination of said moving body;
      obtaining environment information related to an environment of an outside of said moving body by the time when said moving body arrives at a guidance given point that corresponds to said route and at which said vocal output is given; and
      causing said audio output device to selectively vocally output one of a name and a feature of said landmark object based on said environment information at said guidance given point, wherein
   said environment information includes information indicating a weather of the outside of said moving body, and
   when said information indicating said weather being obtained indicates a predetermined weather, said name of said landmark object is vocally output, and when said information indicating said weather being obtained does not indicate said predetermined weather, said feature of said landmark object is vocally output.

2. A movement support apparatus that supports movement of a moving body by causing an audio output device that moves with said moving body to vocally output an announcement of a landmark object, the movement support apparatus comprising:
   a processor to execute a program; and
   a memory to store the program which, when executed by the processor, results in performance of steps comprising,
      obtaining map information;
      obtaining a position of said moving body;
      obtaining a destination of said moving body;
      obtaining a route to said destination retrieved based on said map information, the position of said moving body and the destination of said moving body;
      obtaining environment information related to an environment of an outside of said moving body by the time when said moving body arrives at a guidance given point that corresponds to said route and at which said vocal output is given; and
      causing said audio output device to selectively vocally output one of a name and a feature of said landmark object based on said environment information at said guidance given point, wherein
      said environment information includes a control state of a wiper, and
      said name of said landmark object is vocally output in case of a control state where said wiper is operated, and said feature of said landmark object is vocally output in case of a control state where said wiper is not operated.

3. A movement support apparatus that supports movement of a moving body by causing an audio output device that moves with said moving body to vocally output an announcement of a landmark object, the movement support apparatus comprising:
   a processor to execute a program; and
   a memory to store the program which, when executed by the processor, results in performance of steps comprising,
      obtaining map information;
      obtaining a position of said moving body;
      obtaining a destination of said moving body;
      obtaining a route to said destination retrieved based on said map information, the position of said moving body and the destination of said moving body;
      obtaining environment information related to an environment of an outside of said moving body by the time when said moving body arrives at a guidance given point that corresponds to said route and at which said vocal output is given; and
      causing said audio output device to selectively vocally output one of a name and a feature of said landmark object based on said environment information at said guidance given point, wherein
      said environment information includes a language that is a target for which it is determined whether or not the target matches a language set to said movement support apparatus, and that is used in an area corresponding to the position of said moving body, and when said language used in said area being obtained matches said language being set, said name of said landmark object is vocally output, and when said language used in said area being obtained does not match said language being set, said feature of said landmark object is vocally output.

4. The movement support apparatus according to claim 1, wherein said environment information further includes at least one of
a brightness of the outside of said moving body,
a state where front lights are turned on or off,
information obtained by a vehicle front image obtaining unit or a radar, for identifying whether or not there is a visual obstacle in front of said moving body.

5. The movement support apparatus according to claim 1, wherein said environment information further includes
a brightness of the outside of said moving body, and
when said brightness being obtained is a predetermined threshold or less, said name of said landmark object is vocally output, and when said brightness being obtained is higher than said predetermined threshold, said feature of said landmark object is vocally output.

6. The movement support apparatus according to claim 1, wherein
said environment information further includes a state where a-front lights are turned on or off, and
when said front lights are turned on, said name of said landmark object is vocally output, and when said front lights are turned off, said feature of said landmark object is vocally output.

7. The movement support apparatus according to claim 1, wherein said audio output device is caused to vocally output a feature of a facility or a point adjacent to said landmark object instead of causing said the audio output device to vocally output the feature of said landmark object.

8. The movement support apparatus according to claim 1, wherein as causing said audio output device to vocally output one of said name and said feature, said audio output device is caused to vocally output at least one of a plurality of said features based on a predetermined priority when said landmark object for which a vocal output is given includes a plurality of said features.

9. A movement support method for supporting movement of a moving body by causing an audio output device that moves with said moving body to vocally output an announcement of a landmark object, the movement support method comprising:
(a) obtaining a position of said moving body;
(b) obtaining a destination of said moving body;
(c) obtaining a route to said destination based on map information, the position of said moving body and the destination of said moving body;
(d) by the time when said moving body arrives at a guidance given point that corresponds to said route and at which said vocal output is given, obtaining environment information related to an environment of an outside of said moving body; and
(e) causing said audio output device to selectively vocally output one of a name and a feature of said landmark object based on said environment information at said guidance given point, wherein
said environment information includes information indicating a weather of the outside of said moving body, and
in (e), when said information indicating said weather being obtained in (d) indicates a predetermined weather, said name of said landmark object is vocally output, and when said information indicating said weather being obtained in (d) does not indicate said predetermined weather, said feature of said landmark object is vocally output.

10. A movement support method for supporting movement of a moving body by causing an audio output device that moves with said moving body to vocally output an announcement of a landmark object, the movement support method comprising:
(a) obtaining a position of said moving body;
(b) obtaining a destination of said moving body;
(c) obtaining a route to said destination based on map information, the position of said moving body and the destination of said moving body;
(d) by the time when said moving body arrives at a guidance given point that corresponds to said route and at which said vocal output is given, obtaining environment information related to an environment of an outside of said moving body; and
(e) causing said audio output device to selectively vocally output one of a name and a feature of said landmark object based on said environment information at said guidance given point, wherein
said environment information includes a control state of a wiper, and
in (e), said name of said landmark object is vocally output in case of a control state where said wiper is operated, and said feature of said landmark object is vocally output in case of a control state where said wiper is not operated.

11. A movement support method for supporting movement of a moving body by causing an audio output device that moves with said moving body to vocally output an announcement of a landmark object, the movement support method comprising:
(a) obtaining a position of said moving body;
(b) obtaining a destination of said moving body;
(c) obtaining a route to said destination based on map information, the position of said moving body and the destination of said moving body;
(d) by the time when said moving body arrives at a guidance given point that corresponds to said route and at which said vocal output is given, obtaining environment information related to an environment of an outside of said moving body; and
(e) causing said audio output device to selectively vocally output one of a name and a feature of said landmark object based on said environment information at said guidance given point, wherein
said environment information includes a language that is a target for which it is determined whether or not the target matches a language set to said movement support apparatus, and that is used in an area corresponding to the position of said moving body, and
in (e), when said language used in said area being obtained in (d) matches said language being set, said name of said landmark object is vocally output, and when said language used in said area being obtained in (d) does not match said language being set, said feature of said landmark object is vocally output.

* * * * *